United States Patent Office 3,094,947
Patented June 25, 1963

3,094,947
SUGAR-COATING PROCESS
Julius Green, New City, N.Y., and Paul S. Smith, Hawthorne, N.J., assignors to General Foods Corporation, White Plains, N.Y., a corporation of Delaware
No Drawing. Filed Feb. 12, 1959, Ser. No. 792,697
14 Claims. (Cl. 107—54)

This invention relates to the candy-coating of food products. More particularly, the invention is concerned with the candy-coating of popcorn; nuts like cashew, Spanish and regular peanuts and almonds; ready-to-eat breakfast cereals like puffed wheat and puffed rice; and cereal doughs; and like food products where an even candy-coating is desired.

Heretofore, in candy-coating comestibles like popcorn and puffed breakfast cereal grains it has been the practice to apply a thick sugar syrup or molten candy to the product.

In the case of popped corn, for example, a sugar solution of high concentration was heated in a kettle and the popped corn was added with stirring to distribute the syrup around the popped corn; during the operation butter or some other edible oil may have been added to the popped corn while it was being stirred in order to promote separation of the coated particles from one another; thereafter, it has been customary to cool the candy-coated product by laying it out on trays where a worker smooths the product into thin layers by hand. Such practices call for skill on the part of the processor. Since the sugar concentrations are so high, there is a possibility of sugar-coatings becoming overly caramelized. The mixing operation calls for great physical effort over a prolonged period of time in the case of manual mixing. Mechanical coating operations are also time-consuming and call for the continuous attention of the operator. In attempting to achieve proper mixing of the sugar syrup with respect to the product to be coated there is considerable balling or sticking together of the product, accumulation of caramelized syrup on the inner surfaces of the mixing vessel, and uneven distribution of the coating with respect to the surface of the product to be coated.

In the case of popped corn the problems of candy-coating are particularly pronounced by reason of the irregular surface of the popped corn which has indentations wherein the concentrated sugar syrup can collect and contribute to balling-up of the product. Appearance of the coated popped corn suffers from the uneven distribution of the molten candy such that the popcorn will be dark in some regions, lighter in others, and in some cases only partially coated. Thus, an excessive concentration of molten candy on the popped corn such as occurs in the indentations between the portions of fractured cortex and valleys of the popped corn is a potential center for balling of the candy-coated article.

The problems related hereinabove with respect to popped corn coating, otherwise known as caramel-coating of popcorn, can be related to those which are encountered in the preparation of a ready-to-eat breakfast cereal where a candy-coating is desired. In puffed ready-to-eat breakfast cereals like puffed wheat, puffed rice and puffed cereal doughs where, for desirable flavoring and appearance, a uniform candy-coating is desired, the need for providing an adequate coating which is evenly distributed with respect to the irregular surfaces of the cereal is ever-present. These difficulties are greatly magnified in mass production where relatively efficient candy-coating operations are required which at the same time provide the even distribution which eliminates much of the difficulties alluded to hereinabove. A common expedient in this art has been to tumble the article in a reel with the molten candy whereby coating is effected as the articles rub together and roll over each other. But it has not been possible to fully exploit this expedient for irregularly shaped breakfast cereals due to the uneven distribution of the candy thereon which leads to many of the aforementioned problems.

Spraying of molten candy is another expedient. But, in order that the candy-coating will set up and solidify after it has been applied, it is necessary that the thick sugar syrup be boiled down to a low moisture content of about 2.5%. Problems can arise in the form of darkening or off-flavor development of the coating occasioned by the high temperature heating which is required to render the molten candy in a sufficiently fluid condition to be sprayed. Furthermore, for a batch-type in-store operation where an article like popped corn would be heated at the point of retail sale the practice of spraying is not practical.

It would be desirable, therefore, in any enrobing operation which calls for a candy-coating to have a process which is simple and rapid and provides a uniform distribution of the candy composition on the surface to be coated, quite independent of irregularities in that surface. It would also be most desirable to provide a process from which each candy-coated product is discrete and free-flowing.

The present invention is founded upon the discovery that when a quantity of powdered sugar, powdered hard candy or mixes thereof are present in a tumbling mass of popped corn and like comestibles, the particles can be caused to fuse in place by heat and adhere to the comestible to produce a uniform candy-coating. In this way the powdery coating composition is stationed or fixed discretely with respect to the products to be coated. After the initial adherence of the fused coating portions to the article, such portions are evenly distributed over the surface of the product, which distribution is promoted by agitation on tumbling the product. By virtue of the discrete and controlled stationing of coating material which occurs in fusing the powdery-coating material on the article, the process is not restricted to coating articles with round shapes and, hence, can be used as well for coating non-spherical, irregular or flat comestibles such as popped corn and breakfast cereal chips and flakes.

In accordance with the present invention a blend of finely comminuted sugar, hard candy composition or a combination of such sugar and hard candy powders is mixed with the article to be coated or enrobed, typically popped corn, by tumbling the product with respect to the coating powder to distribute the powder with respect to the article. The mixture of powdered candy or sugar-coating and popped corn is tumbled in a rotating drum, reel or kettle having a cylindrical, curved or polygonal side wall which is caused to rotate in a manner whereby the articles travel generally in the direction of rotation of the mixing vessel and upon achieving a substantial height tumble or cascade downwardly into the lower region of the mixing vessel thereby presenting a plurality of heat-treatable surfaces which continually renew themselves. Heat is focused in any suitable manner on the charge of product being tumbled and preferably is focused at a point just prior to the point where the charge reverses direction in the vessel. In other words, heat is preferably focused on the charge at a point just before the particles of the charge reach the peak of their trajectory and are on the verge of tumbling downwardly. In this connection, the axis of rotation of the rotating vessel should be eccentric to the direction of application of the heat whereby the coated articles tumble generally in the direction of the heat source as well as in the direction of rotation of the mixing vessel. By virtue of the focusing of the heat, by blowing or otherwise, on the tumbling charge of product, the comminuted or powdered coating composition is melted and thereby stationed on the surface of the product discretely and uniformly. As the coating operation proceeds, more and more of the powdery particles are caused to adhere on the surface of the article being coated and to melt such that eventually with continued rotation and tumbling of the mass a uniform and complete coating of the article is achieved. Heat should be focused, i.e., concentrated, on the area where the product is tumbling in order that the surfaces of the articles and the coating particles on the verge of tumbling are continually reintroduced to melting temperatures; hence, the focused heat serves to fix or station the coating particles on the articles instead of on the surfaces of the tumbling vessel, whereby even distribution of the candy formulation is achieved. Continued rubbing or rolling of the product with respect to the powder causes continued pickup by the coated articles.

Focusing or concentration of heat may be achieved by a number of means. The most preferred mode of accomplishing this is to blow a source of heated air directly into the tumbling mass of product and powdered coating composition. For this purpose a blower equipped with suitable heating coils, typically an air gun, i.e., a hot air blower, is positioned so as to point inwardly within the total mixing vessel, the free end of the source of heated air being sufficiently removed from the surfaces of the tumbling product to avoid over-caramelization of the candy coating during the process. Alternatively, other sources of heat energy may be employed, to wit, the radiant heat energy typically provided by infra red lamps, resistance type heaters having parabolic reflectors adapted to focus heat onto the tumbling mass, di-electric heaters and the like.

In carrying out the process of the invention it is important to assure that the heat be properly focused with respect to the rotating tumbling mass of product. When the heat is focused away from the crest of the mass, for instance, on the side of the mixing vessel which does not receive tumbled product, the comminuted candy or sugar-coating composition will agglomerate and be found to occupy the crevices, indentations or other pockets available for collection on the surface of the article to be enrobed. As a consequence, it will be found that the articles being coated will ball-up and, although such balling can be cured to some slight extent by the incorporation of a lubricating medium such as melted butter or seasoning oil, the eventual coated mass will be found to have a very high population of candy accumulations in crevices or indentations on the product. Hence, the coating composition will not be uniformly distributed with respect to the article and will be most susceptible to agglomeration during the cooling process.

In carrying out the process of the present invention, a number of other factors should be taken into consideration. In the first place the size of the sugar or candy-coating composition should be controlled. It has generally been found that a sugar or candy which is very finely ground, viz., that passing a number 20 U.S. Standard Mesh screen, should be employed; preferably, the powdery coating composition should be of a size so that at least 95% of the powder passes a number 20 U.S. Standard Mesh screen and is retained on a number 100 U.S. Standard Mesh screen. Although larger particles may be employed with some success, it is found that the above small size particles of candy or sugar adhere more readily to the tumbling particle and fuse more rapidly and more uniformly, whereby an even coating can be achieved quickly.

Another feature which should be followed is that the mixing vessel be rotated at a speed whereat tumbling provides continual reintroduction of surfaces to be coated to the scene where heat is focused. Thus, if the mixing vessel is operated at too high a speed, frictional forces tend to counterbalance the force of gravity so that tumbling is not provided and as a consequence effective fixation of the coating powder and melting of the discrete particles on the tumbling mass is not experienced. On the other hand, if the mixing vessel is operated at too slow a rate of rotation the component of centrifugal force will not be sufficient to elevate the article to be coated such that it will not tumble downwardly into the scene where heat is focused. A proper balance can be struck by the man skilled in the art when factors such as the size of the mixing bowl, the charge of product to be handled in the bowl, and the speed of rotation as well as time required for heating are taken into consideration. In this connection it has been found desirable to provide flights or projections which protrude inwardly from the surface of the sides of the bowl as in the case of a cylindrical bowl having ribs which proceed helically along the length of the wall of the bowl and serve to assist in elevating the product to a point at which it will tumble downwardly.

Another distinct feature of the present invention has been the finding that more efficient tumbling and shorter coating times can be practiced when the interior of the mixing vessel is coated with a composition capable of offering suitable release properties despite the elevated temperatures practiced to melt and fuse the coating composition. Typically, a silicone resin or a tetrafluoroethylene polymer has been found to offer the ideal release properties. Such a coating prevents adherence of the candy composition to the surface of the bowl or other mixing vessel thereby allowing the candy to preferentially adhere to the article being coated and permitting the product in various stages of coating to tumble more freely thereby shortening the period required to effectively melt and caramelize the sugars employed. Also, with such a vessel-coating, the operator generally finds that there is little or no clean-up required.

Following the complete coating of the article it will be observed when it is removed from the mixing vessel to have an even distribution around even the more irregular surfaces of the article coated, as in the case of popped corn. Melted butter or some oleaginous substance such as vegetable oil is introduced to the mass of tumbled coated articles in order that they will not tend to adhere to one another and rather will be in a condition where they will form separate or discrete coated products. The mixing operation will be continued in the mixing vessel to achieve sufficiently uniform distribution of this oleaginous substance with respect to the sugar-coated product.

Thereafter, the coated article can be allowed to cool gradually to ambient temperatures; but preferably a blast of cooling air is focused on the center of the tumbling charge of coated articles to accelerate the cooling rate. In general, it will be observed that the cooled product will have reached a more or less stable condition when a crackling noise is observed in the mixing vessel. When the sugar-coated product is cooled slowly a dull, less glossy coating will be obtained, whereas when the product is cooled rapidly a very glossy surface is achieved.

Where a frosty or "sanded" appearance is desired other comminuted edible coating powders can be introduced to the tumbling, e.g., confectioners sugar, comminuted maple sugar and coloring or flavoring substances. Thus, as cooling proceeds it will be found that any one of a variety of extraneous coating materials can be added and by virtue of the even distribution of the candy-coating with respect to the article enrobed these extraneous materials will be more uniformly "sanded" or adhered to the coated article. In addition to the "sanding" compositions mentioned hereinabove, other confectionery products like powdered fudge, dried chocolate liquor powder and any confectionery coating customarily employed in candy enrobement can be added prior to solidification of the candy-coating.

Reverting to the coating formulation employed in the finely powdered form in the initial stages of the process, the composition may comprise any one of a variety of sugars such as dried corn syrup solids, confectioners sugar, brown sugar, molasses, granulated sucrose, and mixtures of these. In addition to the flavors related to these various sugars as is the case in maple sugar and brown sugar, extraneous flavoring compositions may be added, typical of which is salt and vanilla. Candies produced by cooling concentrated syrups prepared from these sugars which are thereafter finely ground up may be employed.

Fats and oils, typically butter, may also be blended with such coating powders to provide a "buttery" character. It has been found desirable to employ in the coating formulation a level in the order of 10% and generally ranging between 5–25% of an oleaginous material such as cottonseed oil, soy bean oil, corn oil and the like which also serve to prevent dusting of the finely comminuted particles. Some level of antidusting agent in the comminuted coating composition is preferred, although this practice is not essential since the above-specified tumbling action as well as the practice of focused heat provides rapid coating, thereby minimizing dusting. For cleanliness, however, it is generally preferred to entirely eliminate any degree of dusting and for this reason, therefore, the foregoing fats or oils are preferably employed in the sugar-coating composition.

The temperature to which the coating composition is heated will depend to some extent upon the ingredients of the coating formulation. In general, the coating composition will contain a preponderance or major proportion of sucrose which upon heating to the inversion temperatures of sucrose will provide a distinct caramel flavor which for many uses is desired, particularly in the case of popped corn which has customarily been marketed with a caramel flavor. Thus, the terminal temperature to which the product is heated will in some respects also be governed by the flavor desired for the product. In any event, a temperature above that at which burning or charring of the composition is observed is to be avoided. Broadly, the fusion temperatures of the useable sugar mixtures and powdered hard candies are below 350° F. In order to carry out this invention it is required that the heat source be capable of furnishing heat at the point of coating sufficient to achieve temperatures at which the coating powders are melted. This temperature will vary to some extent with the particle size as well as the composition or ingredients of the powder. Heat sources capable of providing a blast of air heated to a temperature in the neighborhood of 450°–750° F. will be required, this temperature being dependent upon the proximity of the heat source to the point of contact between the coating powder and the article to be coated. Other heaters such as an infra red heater not employing a blast of air as a heat transfer medium, will call for still higher temperatures at the heat source. On the other hand, in the case of di-electric heaters the heat source will be cool whereas the temperature of the coating powder will be high and in the neighborhood of its fusion temperature. Common to all of these conditions, however, will be a terminal temperature at the scene of coating below that temperature at which caramelization and darkening of the candy-coating will not be excessive, viz., 350° F. The minimum terminal temperature will be above that temperature at which the coating composition melts, partially caramelizes and flows to provide a continuous, uniform, even film or coating; typically, this temperature will be above 285° F. The preferred terminal coating temperature where a major proportion of sucrose is employed is in the order of 325° F.

The moisture in the sugar-coating composition should be below 10% and preferably in the neighborhood of 1%, although it is desirable to employ in some formulations such materials as ground sugar which have a moisture content in the order of 3%. In general, the role of moisture appears to be one of extending the period required to promote melting and fusing of the product in the desired manner and in this respect it has been generally found that where a product such as moist popped corn or a moist puffed cereal is to be handled, the product should be pre-dried prior to being introduced to the mixing vessel.

In connection with the mixing vessel, although a batch-type operation has been referred to hereinabove, a continuous operation may also be practiced by using such means as an auger or screw feed which advances the product to be coated together with the sugar-coating composition along a path of travel at a rate commensurate with the period required for fusing and coating distribution. Thus, rotating within a complementary barrel, the flights of a rotor promote the required degree of tumbling of the product such that it is caused to be periodically re-introduced to a source of heat. In such continuous coating heat is focused along a line of points where a maximum of tumbling takes place and is introduced through perforations or slits provided in the complementary barrel. Here also, in order to provide as discrete and free-flowing a product as possible, oil may be introduced at a predetermined point along the path of rotation tumbling and travel of the product within the feeder. Likewise, a blast of cooling air can be introduced along the tumbling path in order to quickly chill the product or otherwise provide the required degree of cooling commensurate with appearance. Similarly, extraneous sanding compositions can be introduced along the path of the product as the enrobing operation proceeds which sanding may take place either during the introduction of the butter or seasoning oil or during the cooling operation.

The manner in which the comminuted sugar or candy-coated composition is introduced to the scene of enrobement is also of some importance. In general it has been observed that the ideal procedure is to premix the articles being enrobed with the powdered coating composition in order to avoid premature heating and agglomeration of the latter. However, it is not intended in the present invention to foreclose the practice of adding the coating composition at any point during the rotation and tumbling operation provided steps are taken to avoid the premature heating and consequent melting and fusing of the powderous materials into agglomerates which agglomerates can contribute to balling-up, and uneven distribution of coating of the articles being enrobed. Furthermore, it is important to exercise care to avoid the employment of an excessive level of the powdery coating composition. In general, it will be observed that the level of candy or sugar in powdered form introduced to the article to be enrobed should be substantially below that level at which an excess of melted and fusible material is allowed to collect on the surface of the article. In other words, just a sufficient proportion of the powdered composition should be employed with respect to the total surface area of the product to assure that the product itself is coated but also to avoid the opportunity for accumulation of excesses which can contribute to balling-up of the product during the coating operation and sticking together of the enrobed coated product during storage.

The invention will now be further described by specific example:

A powdered coating formulation was prepared by blending 560 gms. 6x confectioners sugar; 220 gms. dark brown sugar; 220 gms. dry corn syrup solids having a dextrose equivalency of 42; 100 gms. hydrogenated cottonseed oil and 20 gms. of salt. This powdered composition was of a particle size whereat more than 95% passed a number 20 U.S. Standard Mesh screen and was retained on a number 100 U.S. Standard Mesh screen.

227 gms. of popped corn was placed in a tumbler. The tumbler had a cylindrical wall 12 ins. in diameter and 12 ins. in length. This cylindrical wall was integral at one end with a hemispherical wall portion suitably mounted on a shaft adapted to rotate the tumbler about the axis of the cylindrical wall portion. The axis of the cylindrical wall portion was tilted about 22° from the horizontal to face upwardly. The tumbling vessel was driven at approximately 43 r.p.m. On the inner surface of the tumbler a plurality of inwardly projected ribs were provided in order to promote more efficient tumbling as the tumbling vessel was rotated. Mounted proximate the free end of the rotating tumbler was a heat gun adapted to blast hot air into the rotating vessel.

Approximately 227 gms. of popped corn were placed in the tumbler and the tumbling operation was commenced. Approximately 568 gms. of the above coating powder was added to the tumbling mass of popped corn. Immediately thereafter the heat gun was started. The gun was directed at the center of the tumbling mass of powdered coating and popped corn such that the heat may be said to have been focused centrally with respect to the tumbling mass. The free end of the heat gun was located approximately 1 in. within the free edge of the cylindrical wall portion of the tumbler and delivered heated air at a temperature of about 450° F. at the point of impingement on the tumbling corn.

As the tumbling operation progressed and the heat was continuously focused centrally with respect to the mass of popped corn and coating powder, the powder fused and melted such that it was initially fixed on the surface of the popped corn and thereafter evenly distributed thereover as more and more of the powdery coating composition fused in place and melted on the tumbling popcorn. After the passage of approximately 8 min., approximately 57 gms. of butter was added to the tumbling mass. At this point it will be noted that the coating was evenly distributed with respect to the popped corn and the butter served to promote more separable, discrete coated popped corn; heating was continued for one minute in order to promote uniform distribution of the butter with respect to the coated popcorn. Thereafter delivery of heat to the tumbling mass was terminated but operation of the gun was continued to deliver a blast of cold air, during all of which period the tumbler continued to rotate. The blast of cool air was directed at the mass for approximately 2 minutes or until a noticeable "crackling" was heard indicating solidification of the coating around the popped corn. The coating in this condition was glossy, substantially transparent and evenly distributed without any accumulation of the coating being identified in the crevices or indentations of the popped corn. Following the coating operation the candy-coated popped corn was discharged from the tumbler by tilting the tumbler, the product being deposited upon a tray from which it could be served.

The candy-coated product of this process was noteworthy not only from the standpoint of its appearance but also from the standpoint of its comparative freedom from stickiness when held in the hand or when packaged in quantity. The flavor of the product when eaten was caramel-like. The product retained its free-flowing, discrete, non-sticky character after months of storage when suitable packed.

To the foregoing powdered candy composition may be added suitable flavors and coloring to provide extremely novel appearing products. Thus, the flavor and green color normally associated with lime was incorporated with respect to the popped corn and by virtue of the even uniform distribution throughout the popped corn provides an unusual appearance. The same technique has been employed to provide a cherry flavor and color to popped corn. The coatings in all cases had a hard, sweet, brittle, candy-like character.

Thus, the process is applicable not only to the candy-coating of popped corn but also the coating of other irregular as well as regular shaped food products, namely, ready-to-eat breakfast cereal products in the form of flakes, shaped dough pieces and puffed grains; nuts like almonds, peanuts, Spanish peanuts, walnuts and various other nut meats having a round or irregular surface; fruits, such as raisins; pitted prunes and tangerines; and like food products.

While the present invention has been described with particular reference to a specific example, it is not to be limited thereby, but reference is to be had to the appended claims for a definition of its scope.

What is claimed is:

1. The method of candy-coating pieces of food products which comprises tumbling with a quantity of said food product a quantity of a finely comminuted coating powder having a saccharidal composition which is transformed to a molten candy upon heating, whereby said coating powder is distributed over the surfaces of said food product, heating the tumbling mass of powder and pieces to cause particles of said powder to fuse and adhere discretely to the surfaces of said pieces, and continuing said tumbling and heating until said particles are evenly distributed over said surfaces and fused to said surfaces and to each other to form a substantially uniform and complete coating on said pieces of food product.

2. The method of candy-coating pieces of food products which comprises tumbling with a quantity of said food product a quantity of a finely comminuted coating powder having a saccharidal composition which is transformed to a molten candy upon heating, whereby said coating powder is distributed over the surfaces of said food product, heating the tumbling mass of powder and pieces to cause particles of said powder to fuse and adhere discretely to the surfaces of said pieces, continuing said tumbling and heating until said particles are evenly distributed over said surfaces and fused to said surfaces and to each other to form a substantially uniform and complete molten coating on said pieces of food product, and cooling the coating while continuing said tumbling until the coating has solidified.

3. The method of candy-coating pieces of food products which comprises tumbling with a quantity of said food product a quantity of a finely comminuted coating powder having a saccharidal composition which is transformed to a molten candy upon heating, whereby said coating powder is distributed over the surfaces of said food pieces, heating the tumbling mass of powder and pieces to cause particles of said powder to fuse and adhere discretely to the surfaces of said product, continuing said tumbling and heating until said particles are evenly distributed over said surfaces and fused to said surfaces and to each other to form a substantially uniform and complete molten coating on said pieces of food product, and rapidly cooling the coated product while continuing said tumbling to solidify the molten coating.

4. The method of candy-coating pieces of food products which comprises tumbling with a quantity of said food product a quantity of a finely comminuted coating powder having a saccharidal composition which is transformed to a molten candy upon heating, whereby said coating powder is distributed over the surfaces of said food pieces, focusing heat on the tumbling mass of powder and pieces to cause particles of said powder to fuse and adhere discretely to the surfaces of said pieces, and continuing said tumbling and heating until said particles are evenly distributed over said surfaces and fused to said surfaces and to each other to form a substantially uniform and complete coating on said pieces of food product.

5. The method of candy-coating pieces of food products which comprises tumbling with a quantity of said food product a quantity of a finely comminuted coating powder having a saccharidal composition which is transformed to a molten candy upon heating, whereby said coating powder is distributed over the surfaces of said food pieces, focusing heat on the tumbling mass of powder and pieces by directing a blast of hot air on said mass to cause particles of said powder to fuse and adhere discretely to the surfaces of said pieces, and continuing said tumbling and heating until said particles are evenly distributed over said surfaces and fused to said surfaces and to each other to form a substantially uniform and complete coating on said pieces of food product.

6. The method of candy-coating pieces of food products which comprises tumbling with a quantity of said food product a quantity of a finely comminuted coating powder having a saccharidal composition which is transformed to a molten candy upon heating, said tumbling being carried out by continually causing the mass of powder and particles to be elevated to a height whereat said pieces and said powder cascade downwardly to a lower region from which they are re-elevated, whereby said coating powder is distributed over the surfaces of said food product, focusing heat on the tumbling mass of powder and pieces by directing a continuous blast of heated air on said mass to cause particles of said powder to fuse and adhere discretely to the surfaces of said pieces, and continuing said tumbling and heating to continually reintroduce said powder and said pieces to said blast of heated air until said particles are evenly distributed over said surfaces and fused to said surfaces and to each other to form a substantially uniform and complete coating on said pieces of food product.

7. The method of candy-coating pieces of food products which comprises tumbling with a quantity of said food product a quantity of a finely comminuted coating powder having a saccharidal composition which is transformed to a molten candy upon heating, whereby said coating powder is distributed over the surfaces of said food pieces, focusing heat on the tumbling mass of powder and pieces to cause particles of said powder to fuse and adhere discretely to the surfaces of said pieces, continuing said tumbling and heating until said particles are evenly distributed over said surfaces and fused to said surfaces and to each other to form a substantially uniform and complete molten coating on said pieces of food product, and cooling the coated product while continuing said tumbling until the molten coating has solidified.

8. The method of candy-coating pieces of food products which comprises tumbling with a quantity of said food product a quantity of a finely comminuted coating powder having a saccharidal composition which is transformed to a molten candy upon heating, whereby said coating powder is distributed over the surfaces of said food pieces, focusing heat on the tumbling mass of powder and pieces by directing a blast of hot air on said mass to cause particles of said powder to fuse and adhere discretely to the surfaces of said pieces, continuing said tumbling and heating until said particles are evenly distributed over said surfaces and fused to said surfaces and to each other to form a substantially uniform and complete molten coating on said pieces of food product, and rapidly cooling the coated product while continuing said tumbling to produce a glossy hard solidified candy-coating on said food product.

9. The method of candy-coating pieces of food products which comprises tumbling with a quantity of said food product a quantity of a finely comminuted coating powder having a saccharidal composition which is transformed to a molten candy upon heating, said tumbling being carried out by continually causing the mass of particles and powder to be elevated to a height whereat said pieces and said powder cascade downwardly to a lower region from which they are re-elevated, whereby said coating powder is distributed over the surfaces of said food product, focusing heat on the tumbling mass of powder and pieces by directing a continuous blast of heated air on said mass to cause particles of said powder to fuse and adhere discretely to the surfaces of said pieces, continuing said tumbling and heating to continually reintroduce said powder and said pieces to said blast of heated air until said particles are evenly distributed over said surfaces and fused to said surfaces and to each other to form a substantially uniform and complete molten coating on said pieces of food product, and rapidly cooling the coated product by directing a continuous blast of unheated air on said mass while continuing said tumbling to produce a glossy hard solidified candy-coating on said food product.

10. The method of candy-coating pieces of food products which comprises tumbling with a quantity of said food product a quantity of comminuted coating powder having a particle size whereat the powder substantially passes a #20 U.S. Standard Mesh screen and being of a saccharidal composition which is transformed to a molten candy upon heating, whereby said coating powder is distributed over the surfaces of said food product, heating the tumbling mass of powder and pieces to cause particles of said powder to fuse and adhere discretely to the surfaces of said pieces, and continuing said tumbling and heating until said particles are evenly distributed over said surfaces and fused to said surfaces and to each other to form a substantially uniform and complete coating on said pieces of food product.

11. The method of candy-coating pieces of food products which comprises tumbling with a quantity of said food pieces a quantity of a finely comminuted coating powder having a saccharidal composition which is transformed to a molten candy upon heating and is of a particle size whereat at least 95% of the powder passes a #20 U.S. Standard Mesh screen and is retained on a #100 U.S. Standard Mesh screen, whereby said coating powder is distributed over the surfaces of said food pieces, heating the tumbling mass of powder and pieces to cause particles of said powder to fuse and adhere discretely to the surfaces of said pieces, and continuing said tumbling and heating until said particles are evenly distributed over said surfaces and fused to said surfaces and to each other to form a substantially uniform and complete coating on said pieces of food product.

12. The method of candy-coating pieces of food products which comprises tumbling with a quantity of said food pieces a quantity of a finely comminuted coating powder having a saccharidal composition which is transformed to a molten candy upon heating and including an oleaginous material whereby said coating powder is distributed over the surfaces of said food pieces, heating the tumbling mass of powder and pieces to cause particles of said powder to fuse and adhere discretely to the surfaces of said pieces, continuing said tumbling and heating until said particles are evenly distributed over said surfaces and fused to said surfaces and to each other to form a substantially uniform and complete molten coating on said pieces of food product, and cooling the coated product while continuing said tumbling until the molten coating has solidified.

13. The method of candy-coating pieces of food products which comprises tumbling with a quantity of said food pieces a quantity of a finely comminuted coating powder having a saccharidal composition which is transformed to a molten candy upon heating, whereby said coating powder is distributed over the surfaces of said food pieces, focusing heat on the tumbling mass of powder and pieces to cause particles of said powder to fuse and adhere discretely to the surfaces of said pieces, incorporating a quantity of an oleaginous material into said tumbling mass, continuing said tumbling and heating until said particles are evenly distributed over said surfaces and fused to said surfaces and to each other to form a substantially uniform and complete molten coating on said pieces of food product, and cooling the coated product to produce a hard solidified candy-coated product.

14. The method of candy-coating pieces of food products which comprises tumbling with a quantity of said food product a quantity of a finely comminuted coating powder having a saccharidal composition which is transformed to a molten candy upon heating, said tumbling being carried out by continually rotating the mass to a height whereat said pieces and said powder cascade downwardly to a lower region from which they are continually re-elevated, whereby said coating powder is distributed over the surfaces of said food product, focusing heat on the tumbling mass of powder and pieces by directing a continuous blast of heated air on said mass to cause particles of said powder to fuse and adhere discretely to the surfaces of said pieces, incorporating a quantity of an oleaginous material into said tumbling mass, continuing said tumbling and heating to continually reintroduce said powder and said pieces until said particles are evenly distributed over said surfaces and fused to said surfaces and to each other to form a substantially uniform and complete molten coating on said pieces of food product, and rapidly cooling the coated product by directing a continuous blast of unheated air on said tumbling mass to produce a glossy hard solidified candy-coated product.

References Cited in the file of this patent

UNITED STATES PATENTS

| | | |
|---|---|---|
| 312,041 | Upjohn | Feb. 10, 1885 |
| 1,374,938 | McNulty | Apr. 19, 1921 |
| 2,421,801 | Miller | June 10, 1947 |
| 2,451,096 | Kooman | Oct. 12, 1948 |
| 2,787,978 | Faerber | Apr. 9, 1957 |
| 2,805,639 | Martin | Sept. 10, 1957 |
| 2,958,602 | Gilmore | Nov. 1, 1960 |